(12) United States Patent
Bostrom

(10) Patent No.: US 8,654,349 B2
(45) Date of Patent: Feb. 18, 2014

(54) METHOD AND DEVICE FOR DETERMINING THE TOPOGRAPHY OF A MATERIAL SURFACE

(75) Inventor: Bernt Bostrom, Hagersten (SE)

(73) Assignee: Fibro System AB, Stockholm (SE)

( * ) Notice: Subject to any disclaimer, the term of this patent is extended or adjusted under 35 U.S.C. 154(b) by 286 days.

(21) Appl. No.: 12/451,560

(22) PCT Filed: May 21, 2008

(86) PCT No.: PCT/SE2008/000339
§ 371 (c)(1),
(2), (4) Date: Nov. 18, 2009

(87) PCT Pub. No.: WO2008/147280
PCT Pub. Date: Dec. 4, 2008

(65) Prior Publication Data
US 2010/0134804 A1 Jun. 3, 2010

(30) Foreign Application Priority Data
May 30, 2007 (SE) ...................................... 0701301

(51) Int. Cl.
*G01B 11/30* (2006.01)
(52) U.S. Cl.
USPC ........ 356/600; 356/237.6; 356/613; 356/138; 356/150; 356/446; 250/227.28; 250/559.01

(58) Field of Classification Search
USPC ................ 356/600, 613, 138, 150, 429, 446; 250/227.28, 559.01
See application file for complete search history.

(56) References Cited

U.S. PATENT DOCUMENTS

| | | | | |
|---|---|---|---|---|
| 3,245,306 A | * | 4/1966 | Potter et al. | 356/448 |
| 3,379,050 A | * | 4/1968 | Parker | 73/37 |
| 5,029,469 A | * | 7/1991 | Chase et al. | 73/159 |
| 5,654,799 A | * | 8/1997 | Chase et al. | 356/600 |
| 2002/0071688 A1 | * | 6/2002 | Maruyama | 399/45 |

FOREIGN PATENT DOCUMENTS

| | | |
|---|---|---|
| GB | 1063657 A | 3/1967 |
| GB | 2356256 A | 5/2001 |

* cited by examiner

*Primary Examiner* — Tarifur Chowdhury
*Assistant Examiner* — Isiaka Akanbi
(74) *Attorney, Agent, or Firm* — Mark P. Stone

(57) ABSTRACT

A method and a device for determining a topography under load of the surface of a material, wherein a test piece (40) of the material intended to be determined is subjected to a compression with a determined load between a first and a second clamping surface (7, 27), after which, in a compressed state, at least one representation is made of surface portions of the material that are in contact with at least one of said clamping surfaces (7, 27), and that the representation is evaluated. The compression is controlled in respect of its speed for obtaining said predetermined load, and said at least one representation is made at a chosen point in time or chosen points in time during this process.

20 Claims, 3 Drawing Sheets

METHOD AND DEVICE FOR DETERMINING THE TOPOGRAPHY OF A MATERIAL SURFACE

FIELD OF THE INVENTION

The invention concerns a method and a device for determining the topography of a material surface according to the preambles of the respective independent claims.

BACKGROUND OF THE INVENTION

In most commercial printing processes (for example flexography, intaglio printing and lithography), printing ink is transferred to a paper surface through direct mechanical contact. Since the printed image is formed by a number of small screen dots having diameters of 5-50 µm, it is important to achieve good contact over the entire printing surface. If at all places on the printing area of the paper such a contact is not obtained, ink dots not coming into contact with the paper surface will be missing on the printed surface ("missing dots") which causes blank surface portions or, sometimes in case of multi-colour printing, tinting.

A number of different solutions are known in order to investigate properties of different paper surfaces with regard to the "topography" of the paper in order to assign a value for the paper's ability to correctly receive prints without the occurrence of "missing dots". With the topography of a material surface is here intended the roughness which is caused by small differences in height in the material surface.

The most common methods for measuring the roughness of a paper can be grouped in the following manner:

Test printing in a commercial printing press or a printer in laboratory outfit, where a printing ink is used in order to evaluate the number of missing printing points.

Profilometry, where a stylus is drawn in a straight line over the surface and the topography is recorded.

Air leakage, where a measuring ring is pressed against the test surface and the air leakage between the inside and the outside of the ring is measured.

Optical non-contacting measurement methods, using for example a confocal microscope or can be calculated from a shadow of light which incides at the surface at a small angle.

"The Chapman method", wherein a paper with the aid of a pressuring body is pressed against a flat glass prism (Chapman prism).

During a determination according to the last mentioned method, the paper will lie with larger or smaller portions pressed against the glass of the prism. At points where the contact surface of the prism lacks contact with the test surface, obliquely collimated light inciding against the contact surface will be reflected inside the glass body of the prism and these points thereby appear as dark surfaces in the picture registered by the camera.

In the portions of the contact surface against which the paper is in contact, the light will refract through the contacting surface of the prism and illuminate underlying portions of the paper. These illuminated portions will thereby be light. A picture taken through the prism perpendicular to the clamping surface, will therefore have light and dark portions. This picture is subsequently evaluated to determine the topography of the paper according to the above.

All established measuring methods have one or more drawbacks, since on the one hand they may be time-consuming to use, on the other hand they give insufficient detail information about the properties of the contact surface. Some measuring methods use printing inks which affect the measuring result. Most of them lack pressurizing load during measurement.

AIM AND MOST IMPORTANT FEATURES OF THE INVENTION

The aim of the present invention is to provide a method and a device wherein the drawbacks of the so far known techniques are avoided or at least reduced.

Concerning the Chapman method, the contact surface between a paper surface and a clamping surface of the prism increases with increased pressure force. It has further been found that the contact surface also increases at a constant load as a function of the time when a pressure force is supplied following increased compression of the paper surface over time. For that reason the Chapman method gives an erroneous value of the contact surface, since it compresses the measuring area during an essentially longer time compared to the conditions in a printing press.

In an ordinary printing process, a paper web is transferred at great velocity through a printing nip with a high nip load with which the paper becomes compressed. A point on the paper web normally remains in the printing nip during a very short time, typically 10-50 milliseconds (ms).

The invention offers the possibility of performing quality control of the printing properties of a material and in particular of a paper, with a more relevant measuring method, which can be performed fast and simple in connection with the production by ordinary, not specially trained, operating personnel. With the method suggested here, a single measurement only takes a few seconds to carry through. The method according to this invention gives an image of the paper in a condition which well corresponds to the conditions that prevail at the very printing event.

Further there can be used an adjustable test load in order to reproduce the pressure forces which appear in a printing press during different printing methods with such different conditions as for example flexography (2.5 MPa) or intaglio printing (10 MPa). The suggested method therefore gives an exact and direct quality measurement for the test surface in relation to the selected printing method.

An apparatus with illumination and image capturing such as for the Chapman method as described above is preferably used.

A paper test piece is hereby introduced between an upper, rigidly mounted glass body in the form of said prism with a flat underside and a lower, flat compression body, which is movable in the direction to and from the prism. The compression body is quickly pressed against the lower side of the glass body until a predetermined load has been reached and the paper thus has been pressed between the glass body and the compression body corresponding to the provisions that prevails in a printing nip.

At a determined point in time during the compression, an image of the paper is captured, which image can thereafter be evaluated. It is also within the scope of the invention that a plurality of images are captured at different points in time during the compression process in order to control the dynamic compressibility of the topography of the paper as a function of time during the process and make it possible to evaluate how the paper performs during different phases of a printing process.

There are many possibilities of varying the invention. The system can thus be adjusted in order to correspond to different printing methods when it comes to:

nip load, in order to simulate the compression in the printing nip, acceleration, in order to simulate different web speeds in a printing press, the compression time during set maximum pressuring force, the point(s) in time at which one or more images shall be registered by the camera.

It is important for the invention to simulate the true conditions the paper is exposed to in a real printing process and to synchronize the registration such that it occurs at desired point(s) in time during the very short compression of the test specimen.

"Dynamic topography" refers to the topography of a material surface during a dynamic process, in particular according to the invention in a fast process such as in a real printing process.

With reference to the feature that at least one representation is created from surface portions of the specimen which are in contact with at least one of said clamping surfaces according to the invention, also includes the reverse, namely representations of surface portions of the specimens that are not in contact with at least one of said clamping surfaces, since also this can be consider a form of representations of surface portions of the material which are in such a contact. Essential is that the topography is determined through said representation.

BRIEF DESCRIPTION OF DRAWINGS

The invention will now be described in more detail by way of embodiments and with reference to the drawings, wherein.

DETAILED DESCRIPTION OF EMBODIMENTS

Figure 1:
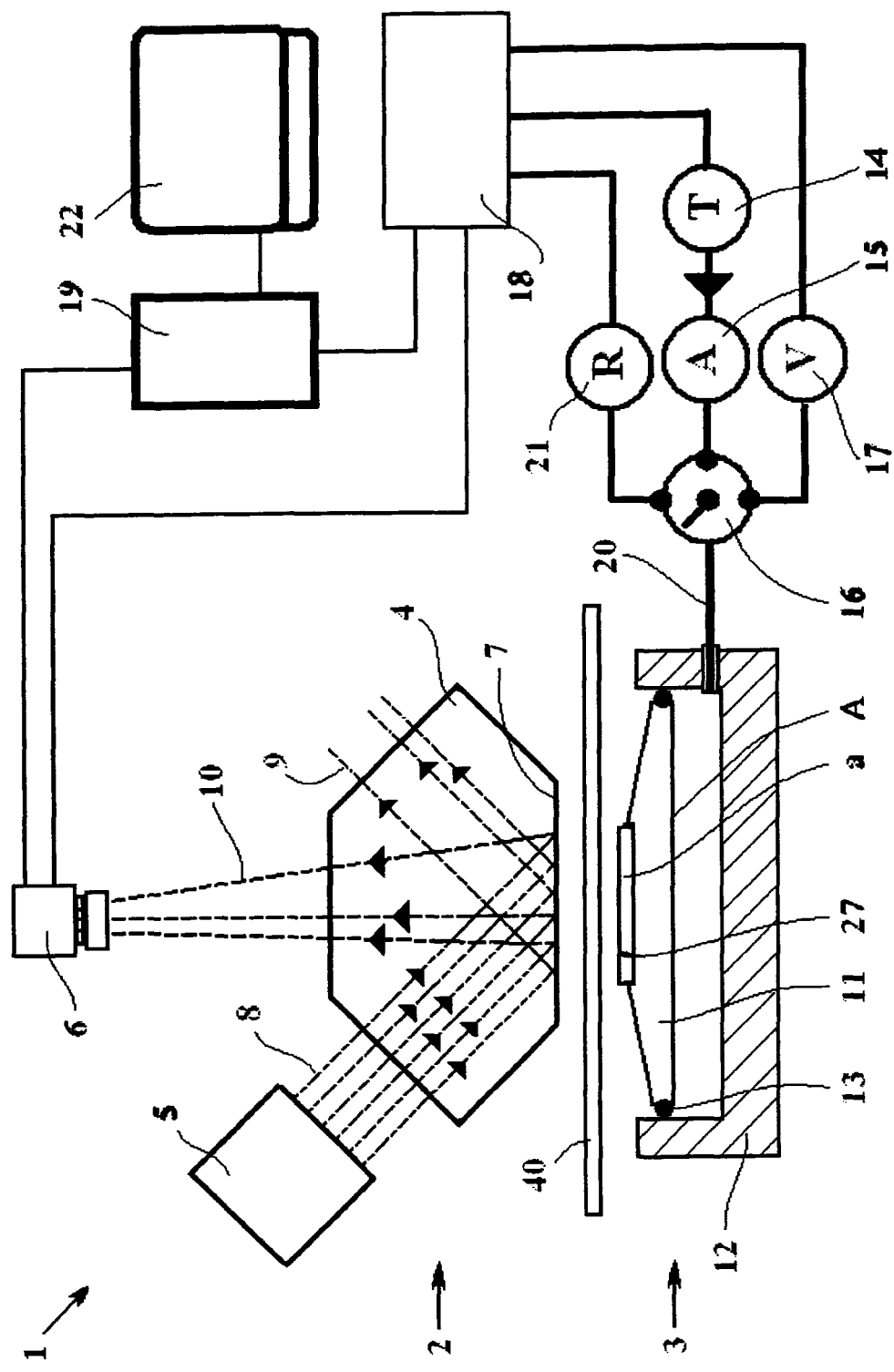
FIG. 1 diagrammatically shows a device according to the invention for determining the topography of a material surface.

With reference numeral 1 is generally indicated a device according to the invention for determining the dynamic topography of a material surface and in particular the surface of a paper, in relation to its ability to receive a print through mechanical contact.

The device 1 includes an illuminating and representation unit 2 and a compression unit 3. The unit 2 includes a prism 4 which can be of the Chapman prism type, an illumination device 5 and a camera 6 with associated lens system. The lower surface of the prism 4, as seen on the image, is a clamping surface 7. The beam path from the illumination device 5 is indicated with broken lines, wherein with 8 is indicated light inciding against the clamping surface 7 of the prism and with 9 reflected light from the clamping surface on the prism where there is no contact with the surface of the test piece.

In the portions of the contact surface against which the paper come into contact, according to the above, the inciding light 8 will be refracted through the clamping surface 7 of the prism and illuminate underlying portions of the paper. These illuminated portions will thereby become light. Light from these illuminated portions that reaches the camera 6 are in the figure indicated with 10. See in this connection also FIG. 1b.

The positions where (only shown for the sake of clarity) light beams are refracted because of prevailing contact are marked with rings.

A test piece to be evaluated is indicated with 40, and it can be held pressed together, according to the device in the shown example, pressed against the clamping surface 7 of the prism with the aid of a piston-formed compression body 11 being included in the compression unit 3. This compression body 11 is in the shown example provided with a clamping surface 27 directed against the test piece 40 having the area "a" whereas its lower side, which is affected by a load (as described below) has the area "A".

The compression body 11 is movable up and down in a cylinder housing 12 and is sealed against the inner surface of the cylinder housing through a sealing ring 13. Whereas the compression body has a small mass, damage to the lower side of the glass body is avoided. Thereby a compressed position can be reached in a very short time.

In the figure is for clarity reasons the parts 4 and 11 shown separated so far that there is shown distances also between the respective clamping surface 7 and 27 and the test piece 40. In compressed position, of course, the test piece is lying squeezed between the clamping surfaces 7 and 27.

A pressure conduit 20 is connected to the cylinder housing 12 and is also connected to a valve 16, which is connected to a control unit 18. 19 indicates a computer unit which is connected to a display screen 22, which on the one hand can be a touch screen for the actuation of the device, on the other hand be a screen which is connected to the camera 6 for showing images captured by the camera 6 during a test process.

In order to obtain pressure forces exceeding what is directly possible by the aid of available pressure air, the invention has been provided with a pressure rising unit T 14, wherein normal system air pressure (for example 6 bar) can be stepped-up to a required, higher pressure (for example 15 bar), which can be stored in an accumulator tank A 15.

Figure 1B:
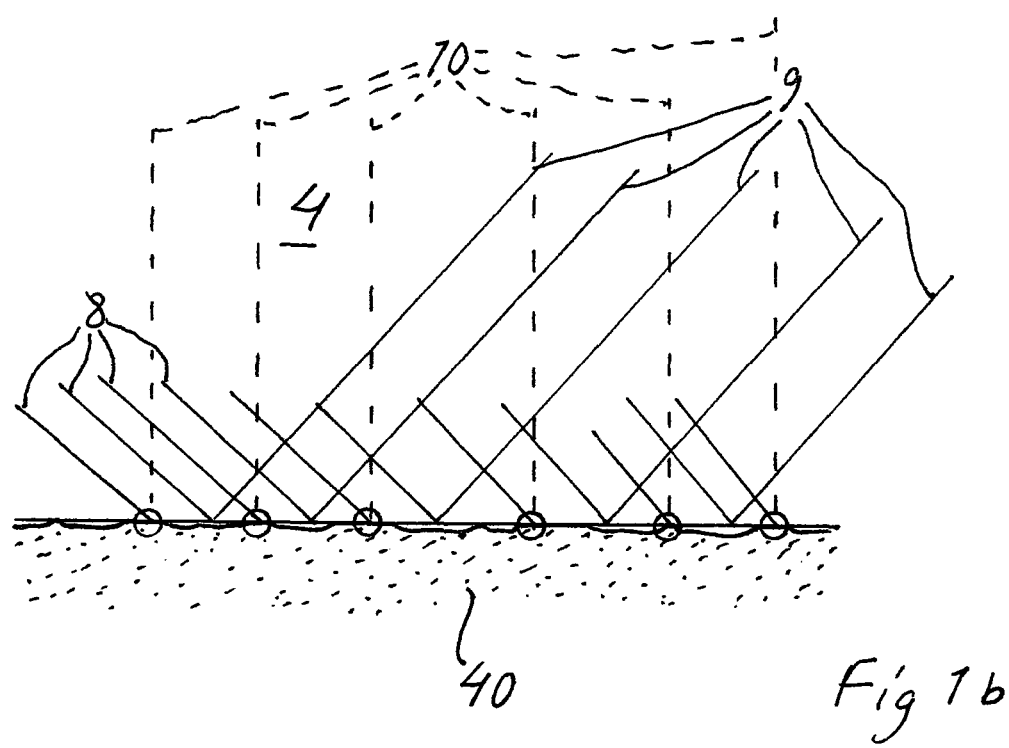
FIG. 1b shows in an enlarged scale a contact area between a prism and a test piece.
Figure 2:
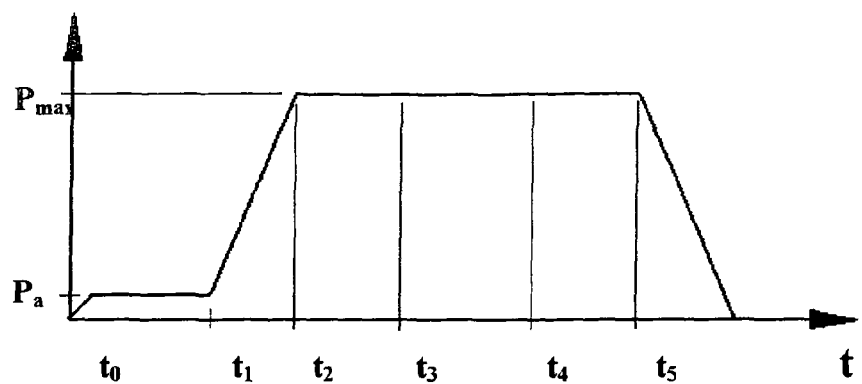
FIG. 2 shows a curve over compression pressure as a function of time in a method according to the invention.

In FIG. 2 is shown the load as a function of time for a pressuring process performed by the device according to FIG. 1. At the time $t_0$ an application load $P_a$ is applied onto the compression body 11 in FIG. 1 in order to firstly come close to the clamping surface 7 of the prism 4 and thereby avoid dynamic forces in the following step, secondly thereby to ensure parallelism between the clamping surface 27 of the compression body 11 and the clamping surface 7 of the prism. Actuating the cylinder housing 12 with load of the comparatively low load level $P_a$ can be made in different ways. In FIG. 1 is shown a regulator R 21, which after signal from the control unit 18 provides this pressurization. By applying a low initial application load $P_a$ this way, the compression body 11 will move in the direction of the glass prism and lie against and hold the test piece in position. The compression body 11 will thereby be positioned parallel to the lower side of the prism.

At the time $t_1$ in FIG. 2 a control signal is emitted from the control unit 18 to displace the valve 16 into a position A, where the pressure in the pressure tank 15 is transferred to the cylinder housing 12. Hereby a quick pressure increase takes place in the cylinder housing 12 up to the pressure level $P_{max}$ at the time $t_2$. The pressure level $P_{max}$ can be chosen such that it corresponds to a chosen printing process, for which the paper or the like is to be evaluated.

When the pressure $P_{max}$ has been reached, one or more images are captured, for example at the points in time $t_3$ and $t_4$. It can also be the case that images are captured during pressure build-up between the points in time $t_1$ and $t_2$. The time point $t_5$ indicates release of the pressure inside the cylinder housing 12, whereby the valve 16 is moved to a position V which connects the cylinder housing 12 to an under-pressure 17.

It is also possible through construction of the valve and the valve actuating device 17 to alter the characteristic of the curve in FIG. 2 for example such that it can assume different non-linear paths or be made more or less flattened. The progress of the pressure increase between the pressure $P_a$ och $P_{max}$ can also be controlled as desired.

Through the shown construction of the compression body, a relatively low pressure can be used for pressurizing the chamber such that a higher load is obtained against the test piece through the relation between the areas: A/a.

Figure 3:
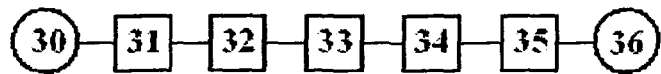
FIG. 3 shows a method sequence in the form of a simple flow chart.

FIG. 3 illustrates a method sequence according to an embodiment of the invention, wherein:

Position 30 indicates the start of the sequence.

Position 31 indicates the insertion of a paper test piece in the slot between the two clamping surfaces and choice of parameter values such as maximum load level, pressure build-up characteristics and points in time for image registration for the test in question.

Position 32 indicates initiation of a low application load $P_a$ onto the compression body.

Position 33 indicates initiation of a pressure pulse $P_{max}$ onto the compression body.

Position 34 indicates capturing of one or more representations of the compressed test piece with one or more exposures, by letting the control unit synchronize the image registration either at a certain point in time after initiation of the pressure pulse, at a certain pressure level or at a certain time after reaching a certain pressure level.

Position 35 indicates evaluation of said image (images) or representation (representations).

Position 36 indicates the termination of the sequence.

Figure 4:
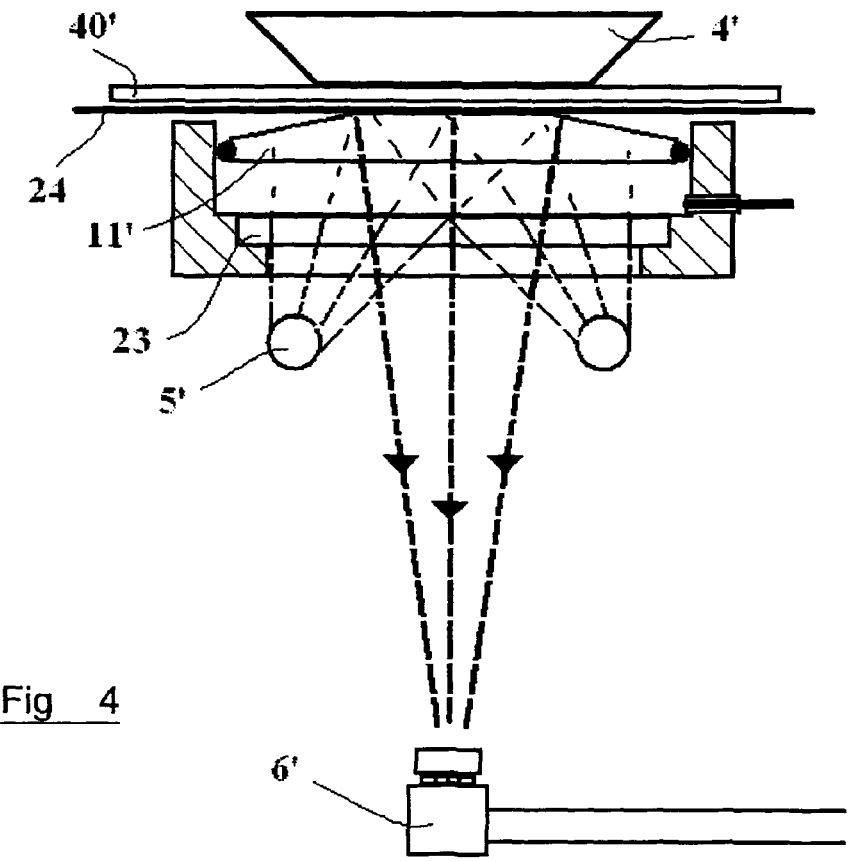
FIG. 4 shows a detail of a variant of the invention.

The invention can be modified within the scope of the following claims. The illumination and representation unit can thus be constructed differently. For example it could be that illumination is made differently, which is indicated in FIG. 4 through a transparent compression body 11', which presses against a quickly reacting pressure sensitive foil 24, which in turn lies in contact against a test piece 40', which is pressed against a rigid flat body 4'. At contact areas of the foil 24 it is arranged to for example change colour in order for local variations of the load distribution of the surface to be registered through the camera 6'.

In an alternative embodiment a representation can also be established from surface portions of the specimen which are not in contact with the prism. This can most simply be understood such, with reference to FIGS. 1 and 1b, that a camera 6 or the like is positioned for registration of the reflected beams 9. This method can be used in order to obtain a corresponding or essentially reverse representation to the embodiment which is appearing from FIG. 1.

Compression using a compression body can also be made differently than through the shown pneumatic method, for example purely mechanical by way of a mechanical or hydraulic actuation device or otherwise. Variants of the invention can use other means for obtaining pressure even if the pneumatic method, which is shown in FIG. 1, is preferred.

Further the surface of the compression body can be constructed differently or have different properties. On the one hand the clamping surface can be rigid. On the other hand it can be elastic such as provided with a rubber blanket, whereby the advantage is obtained that conditions can be simulated in a direction of printing with a rubber coated offset cylinder, even if the very rubber blanket will act on a non printing receiving surface of the test piece, since the elastic blanket will partially exert an increased impression of the test piece against the prism or the corresponding contact surface.

In a practical embodiment of the invention, the distance is small between the mutually movable surfaces that compress the test piece by the compression body firstly being applied with a lower load from a lower pressure of for example 0.3 bar during a short while in order to set the compression body in parallel with the glass body. This application force is typically held between about 4 and 25% of said predetermined load depending of the printing method to be simulated and is preferably less than 10% of the maximum pressuring force in order not to affect the test result.

The space under the movable compression body is thereafter loaded with a pressure air pulse set such that the paper is compressed with the desired load in a very short while between the two compressing flat surfaces. After having reached a set test load after a predetermined time, for example after initiated process, (typically after 1-100 milliseconds) one or more images of the contact surface are captured through the upper glass body. At terminated testing, the movable compression body is lowered by means of an under-pressure which is applied to the chamber of the cylinder housing such that the test piece can be removed.

Registered images are analyzed and evaluated in respect of the likelihood of "missing dots", which is presented as a quality measurement.

The test piece 40, 40' can also be evaluated in respect of the dynamic compressibility of the topography as a function of time starting out from a plurality of representations made at different points in time. This can be of great value in order to fully predict the suitability of the material in different printing processes, since it can be essential, for example to get an image of the behaviour of the material in processes of different duration. The means for carrying out this evaluation is suitably provided within the computer unit 19.

Other test materials than paper can be examined with a method according to the invention such as for example different textiles or plastic materials.

The load levels that can be appropriate are those that correspond to different printing processes, for example: 2.5 MPa in order to simulate flexography, 5.0 MPa in order to simulate offset printing and between 7.5 MPa and 15 MPa in order to simulate different types of typographic printing methods. In general terms it could be said that a normal load range within which the invention is used is between about 1 MPa and 20 MPa. Other load values can, however, come into question.

The invention claimed is:

1. Method for determining a topography under load of the surface of a material for one or more printing processes, wherein a test piece of the material intended to be determined is subjected to a compression with a predetermined load between a first and a second clamping surface, after which, in a compressed state, registration is carried out by at least one representation being made of surface portions of the material that are squeezed between and in contact with said first and second clamping surfaces, and that the representation is evaluated, the steps of said method comprising:

controlling the compression between said first and said second clamping surfaces in respect of its speed for obtaining said predetermined load and for simulating the true conditions a test piece is exposed to in said one or more printing processes, and synchronizing the registration such that said at least one representation is made at a chosen point in time or chosen points in time during a period when compression of the test piece prevails, wherein the compression is made through movement of one of the clamping surfaces being arranged on a movable compression body, and wherein said predetermined load is set to be between 1 MPa and 20 MPa.

2. Method according to claim 1, wherein the process is controlled in order to simulate the conditions in any process from the group: a flexographic printing process, an offset printing process, a lithographic printing process, an intaglio printing process.

3. Method according to claim 2, wherein the compression is controlled as concerns load build-up progress in order to obtain said predetermined load.

4. Method according to claim 1, wherein the compression is controlled as concerns load build-up progress in order to obtain said predetermined load.

5. Method according to claim 1, wherein the movable compression body is adjustably pressurized.

6. Method according to claim 1, wherein the duration of the compression is adjusted.

7. Method according to claim 1, wherein each said representation is made in the form of an analogue or digital representation, wherein said chosen point in time or chosen points in time for making the representation is controlled in relation to a period when compression prevails.

8. Method according to claim 1, wherein a plurality of representations are made at different points in time, wherein the test piece is evaluated in respect of its dynamic compressibility in respect of its topography as a function of time.

9. Method according to claim 1, wherein said chosen point in time or chosen points in time during a period when compression of the test piece prevails is within a period of about 1-100 milliseconds after initiation of the progress of compressing to a predetermined load.

10. Method according to claim 1, wherein a lower side of an obliquely illuminated prism is used as the second clamping surface.

11. Method according to claim 1, wherein the test piece is applied with an application load of a lower load level before compressing to said predetermined load is initiated.

12. Method according to claim 11, wherein the application load is between about 4 and 25% of said predetermined load.

13. Device for determining a topography under load of the surface of a material for one or more printing processes, including means for subjecting a test piece of the material intended for determining to a compression with a predetermined load between first and second clamping surfaces, and means for, in a compressed state, carrying out registration by making at least one representation of surface portions of the material which are squeezed between and in contact with said first and second clamping surfaces, said device comprising:
- means for controlling the compression between said first and said second clamping surfaces in respect of its speed in order to obtain said predetermined load and for simulating the true conditions a test piece is exposed to in said one or more printing processes, and
- means for synchronizing registration in order to make said at least one representation at a chosen point in time or at chosen points in time during a period when compression of the test piece prevails,
- means for setting said predetermined load between 1 MPa and 20 MPa, and
- one of said clamping surfaces being arranged on a movable compression body.

14. Device according to claim 13, further including means for controlling compression in respect of a load build-up progress in order to obtain said predetermined load.

15. Device according to claim 13, wherein the movable compression body is arranged to be controllably pressurized.

16. Device according to claim 13, further including means for adjusting the duration of the compression.

17. Device according to claim 13, wherein said means for making said representation includes an analogue or digital camera, and means for controlling said chosen point in time or chosen points in time for making the representation in respect to a period when compression prevails.

18. Device according to claim 13, further including means for evaluating the test piece in respect of the dynamic compressibility of its topography as a function of time starting out from a plurality of representations made at different points in time.

19. Device according to claim 13, further including an obliquely illuminated prism having a lower side which is used as the second clamping surface.

20. Device according to claim 13, further including means for subjecting the test piece to an application load of lower load level before initiating compression to said predetermined load.

* * * * *